United States Patent
Miki et al.

(10) Patent No.: US 10,638,004 B2
(45) Date of Patent: Apr. 28, 2020

(54) INFORMATION PROCESSING APPARATUS AND NON-TRANSITORY COMPUTER READABLE MEDIUM WITH AN INDICATOR LIGHT FOR NOTIFYING A USER OF A SWITCHING-ON STATE

(71) Applicant: FUJI XEROX CO., LTD., Tokyo (JP)

(72) Inventors: Masayoshi Miki, Kanagawa (JP); Teiju Sato, Kanagawa (JP); Masato Saito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/589,451

(22) Filed: May 8, 2017

(65) Prior Publication Data

US 2018/0131817 A1    May 10, 2018

(30) Foreign Application Priority Data

Nov. 8, 2016  (JP) ................................. 2016-218361

(51) Int. Cl.
| | |
|---|---|
| *G06F 3/12* | (2006.01) |
| *H04N 1/00* | (2006.01) |
| *G03G 15/00* | (2006.01) |

(52) U.S. Cl.
CPC ....... *H04N 1/0049* (2013.01); *G03G 15/5016* (2013.01); *H04N 1/00408* (2013.01); *H04N 1/00891* (2013.01); *H04N 1/00901* (2013.01); *H04N 2201/0094* (2013.01)

(58) Field of Classification Search
CPC ............. H04N 1/00891; H04N 1/0049; H04N 1/00408; H04N 1/00901; H04N 2201/0094; G03G 15/5016

USPC .................................................. 358/1.1–1.18
See application file for complete search history.

(56) References Cited

U.S. PATENT DOCUMENTS

| | | | |
|---|---|---|---|
| 2009/0021761 A1* | 1/2009 | Suzuki ............... | H04N 1/00387 358/1.13 |
| 2014/0132977 A1* | 5/2014 | Takahashi ............ | G03G 15/502 358/1.14 |
| 2015/0261168 A1* | 9/2015 | Yokoyama ............. | G03G 15/80 399/81 |

FOREIGN PATENT DOCUMENTS

JP    H11-289502 A    10/1999

* cited by examiner

*Primary Examiner* — Gabriel I Garcia
(74) *Attorney, Agent, or Firm* — Oliff PLC

(57) ABSTRACT

An information processing apparatus includes a power supply switch, a display, a light-emitting unit, and a controller. The power supply switch is used to perform a control function. The display is such that a time from switching on of the power supply switch until occurrence of a screen change is long and a user is likely to fail to correctly recognize a switching-on state. The light-emitting unit is switched on in a time until the screen change occurs. The switching on is performed in such a manner that the user is notified that the power supply switch is in a switching-on state. After the controller is activated through an operation of switching on the power supply switch, the controller switches off the light-emitting unit according to a switching-off condition.

12 Claims, 5 Drawing Sheets

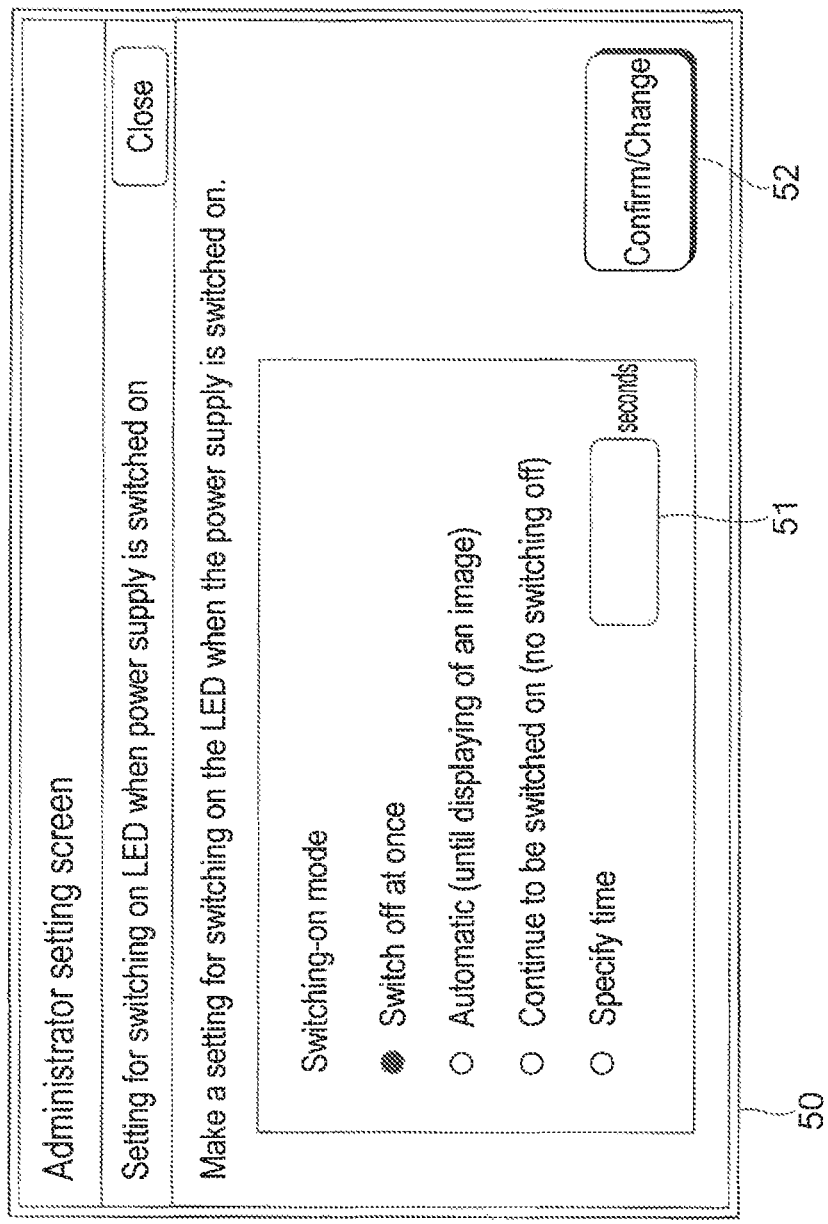

INFORMATION PROCESSING APPARATUS AND NON-TRANSITORY COMPUTER READABLE MEDIUM WITH AN INDICATOR LIGHT FOR NOTIFYING A USER OF A SWITCHING-ON STATE

CROSS-REFERENCE TO RELATED APPLICATIONS

This application is based on and claims priority under 35 USC 119 from Japanese Patent Application No. 2016-218361 filed Nov. 8, 2016.

BACKGROUND

(i) Technical Field

The present invention relates to an information processing apparatus and a non-transitory computer readable medium.

(ii) Related Art

Some printers for business use are each provided with a sub-power supply switch for activating control functions. In such printers, the switching-on state of the sub-power supply switch is indicated by switching on a dedicated light-emitting diode (LED).

SUMMARY

According to an aspect of the invention, there is provided an information processing apparatus including a power supply switch, a display, a light-emitting unit, and a controller. The power supply switch is used to perform a control function. The display is such that a time from switching on of the power supply switch until occurrence of a screen change is long and a user is likely to fail to correctly recognize a switching-on state. The light-emitting unit is switched on in a time until the screen change occurs. The switching on is performed in such a manner that the user is notified that the power supply switch is in a switching-on state. After the controller is activated through an operation of switching on the power supply switch, the controller switches off the light-emitting unit according to a switching-off condition.

BRIEF DESCRIPTION OF THE DRAWINGS

Exemplary embodiments of the present invention will be described in detail based on the following figures, wherein:

FIG. 3 is a diagram for describing timings at which a light-emitting diode (LED) is switched on and off after a power supply switch is switched on;

FIG. 6 is a diagram illustrating an exemplary administrator setting screen prepared to set a condition of switching off the LED when the power supply switch is switched on.

DETAILED DESCRIPTION

Exemplary embodiments of the present invention will be described in detail below with reference to the attached drawings.

First Exemplary Embodiment

System Configuration

Figure 1:
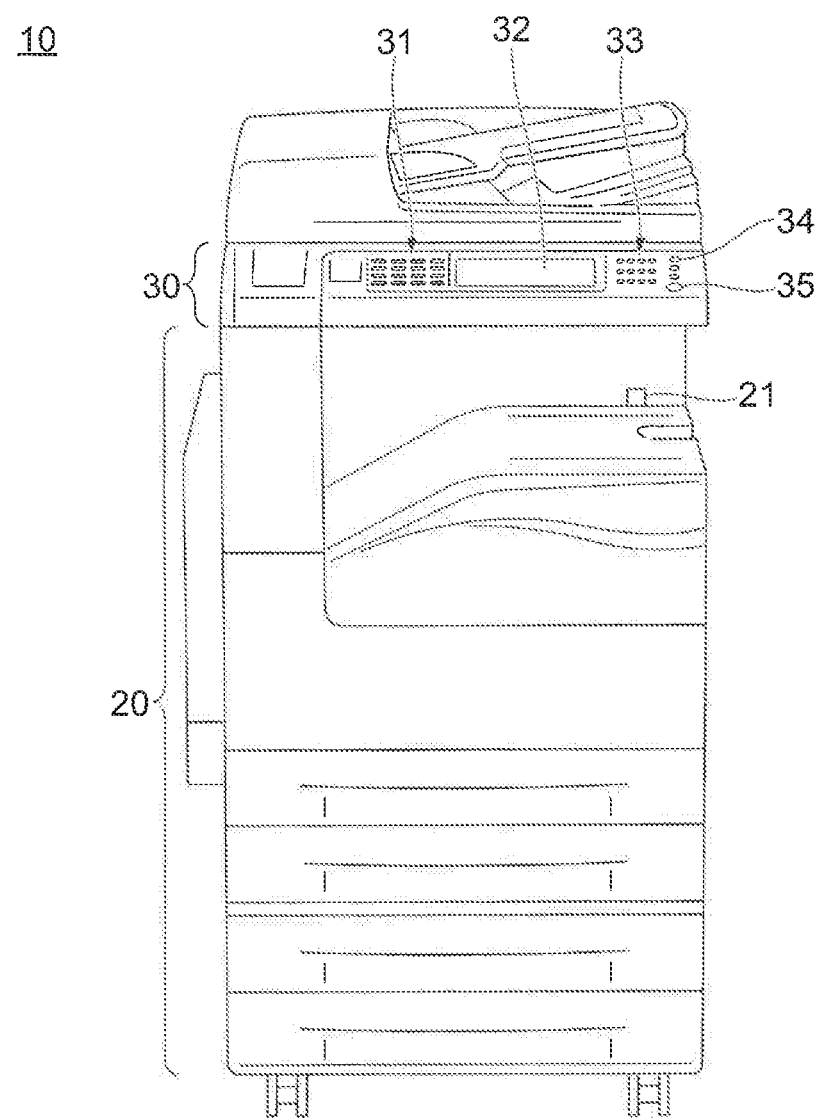
FIG. 1 is a front view of an exemplary configuration of the appearance of an image forming apparatus provided with multiple functions.

FIG. 1 is a front view of an exemplary configuration of the appearance of an image forming apparatus 10 provided with multiple functions. The image forming apparatus 10 according to a first exemplary embodiment is provided with a copy function, a scanner function, a fax receiving/transmitting function, and a print function. The image forming apparatus 10 may be an apparatus specializing in one function, for example, a scanner, a fax transceiver, a printer (including a three-dimensional printer), or an image editing apparatus. The image forming apparatus 10 according to the first exemplary embodiment is an exemplary information processing apparatus.

The image forming apparatus 10 includes an apparatus body 20 and an operation receiving unit 30. The apparatus body 20 contains hardware and a control board that are compatible with the above-described multiple functions. The operation receiving unit 30 is used to receive operations from a user.

On the apparatus body 20, a power supply switch 21 for activating a control unit (not illustrated) through an operation of switching on the power supply switch 21 and providing software processing for the above-described multiple functions is disposed. In the first exemplary embodiment, the power supply switch 21 is disposed on a surface of a center tray onto which sheets having been subjected to copying or printing are ejected.

The position at which the power supply switch 21 is disposed is not limited to this. The power supply switch 21 may be disposed on the operation surface of the operation receiving unit 30, a side surface of the apparatus body 20, or the like. In the first exemplary embodiment, a main power supply switch used to supply power to the units of the apparatus is not provided. Connection of a power cable (not illustrated) to a wall outlet plays the same role as an operation of switching on a main power supply switch.

For example, one touch buttons 31 used for one touch input of a destination, a display 32 used for display of information, numeric buttons 33 used to input a numeric, such as the number of copies or a personal identification number, a light emitting diode (LED) 34 used to provide notification of the state of the power supply, a start button 35 used to transmit an instruction to start reading of a document, and the like are disposed on the operation receiving unit 30. The LED 34 according to the first exemplary embodiment is an exemplary light-emitting unit. When the power supply switch 21 is switched on, the LED 34 is switched on at once. When a condition of switching off the LED 34, which is described below, is satisfied, the LED 34 is switched off. In the first exemplary embodiment, switching on of the LED 34 encompasses a state in which the LED 34 is repeatedly switched on and off at short intervals, that is, a so-called blinking state. The LED 34 provides a notification indicating that the image forming apparatus 10 is in the power-saving mode, through switching on of the LED 34.

In the first exemplary embodiment, the LED 34 is disposed at a position at which it is possible for a user operating the power supply switch 21 to view the LED 34 while the user is operating the power supply switch 21. Even when the power supply switch 21 is disposed on a side surface of the apparatus body 20 or the like, the LED 34 is disposed at a position at which it is possible for the user to view the LED 34 while the user is operating the power supply switch 21. In this manner, the user easily checks the switching-on state of the power supply.

Figure 2:
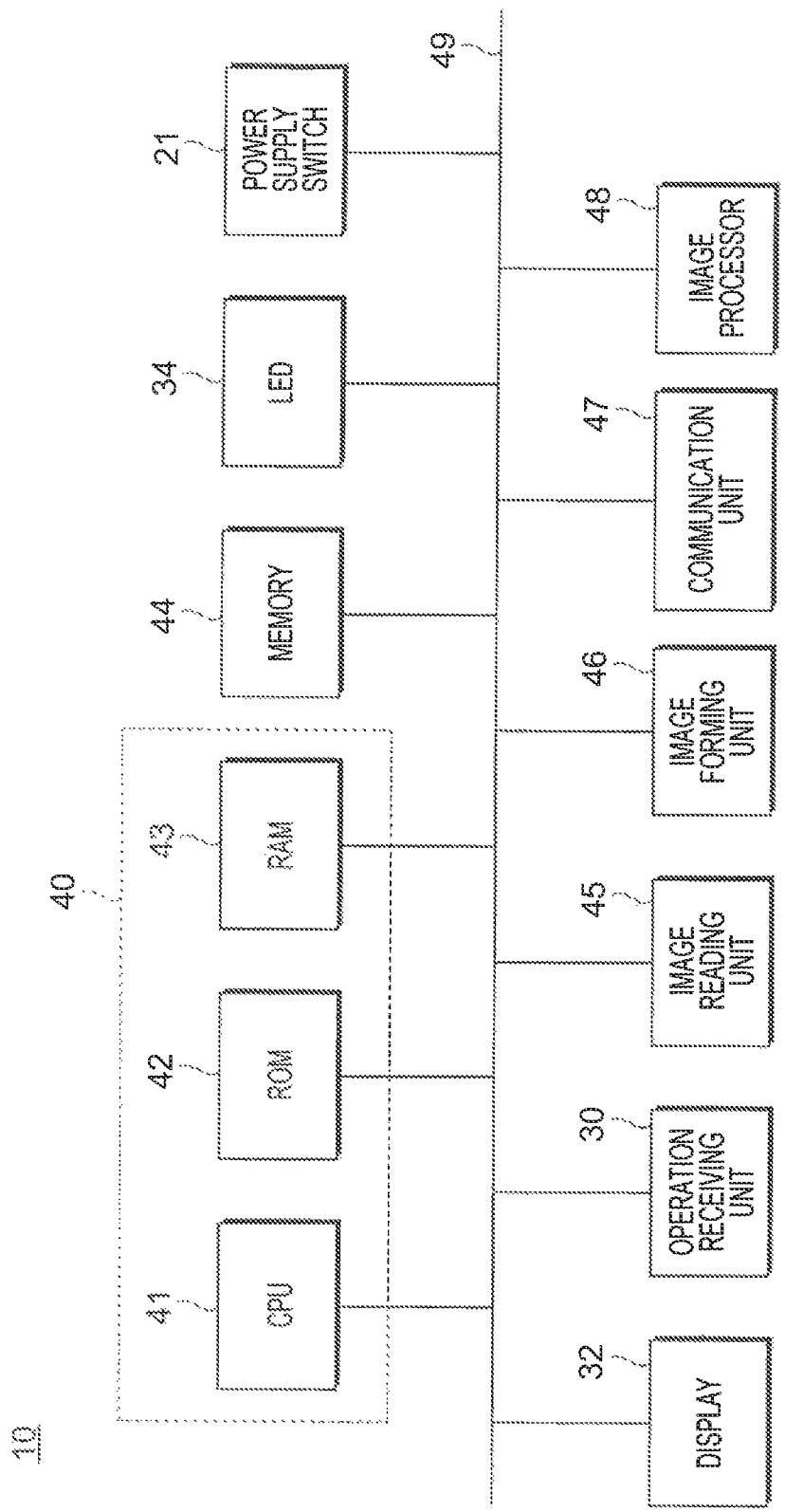
FIG. 2 is a diagram for describing an exemplary functional configuration of the image forming apparatus.

FIG. 2 is a diagram for describing an exemplary functional configuration of the image forming apparatus 10. The image forming apparatus 10 includes a control unit 40 that controls the entire apparatus, a memory 44 used to store images used in copying and printing, an image reading unit 45 that reads an image on a document which is set on the image reading surface, an image forming unit 46 that forms an image on a sheet which is exemplary recording material and that is, for example, an electrophotographic system or an inkjet system, a communication unit 47 used to communicate with external apparatuses, an image processor 48 that performs image processing, such as color correction and tone correction, on an image represented by image data, the power supply switch 21 that activates the control unit 40, the operation receiving unit 30 that receives input operations performed by a user, the display 32 used for display of an operation receiving screen and a still image, and the LED 34 used for notification of the state of the power supply. The units described above are connected to a bus 49, and receives/transmits data through the bus 49.

The control unit 40 is a so-called computer and is an exemplary controller. The control unit 40 includes a central processing unit (CPU) 41 that executes programs, a read only memory (ROM) 42 used to store programs, such as a basic input/output system (BIOS) and firmware, and data, and a random access memory (RAM) 43 that provides a work area for programs.

In the first exemplary embodiment, when the power supply switch 21 is switched on, the control unit 40 starts an activation process (also referred to as an initialization process). After completion of the activation process, the control unit 40 performs various processes according to programs, for example, a process of displaying an image on the display 32, a process of forming an image on a sheet, a process of generating a read image, and a process of switching off the LED 34. In the first exemplary embodiment, it takes a time equal to or more than a few seconds (for example, three seconds) to perform the activation process.

The memory 44 is constituted by storage devices, such as a hard disk device and a semiconductor memory. The image reading unit 45 is constituted by a so-called scanner. The image forming unit 46 is a print engine forming an image, for example, on a sheet that is exemplary recording material. The communication unit 47 includes, for example, a local area network (LAN) interface and a reading device for an external memory. The image processor 48 includes, for example, a dedicated processor for performing image processing, such as color correction and tone correction, on image data.

In the first exemplary embodiment, the display 32 includes, for example, a liquid-crystal display. The liquid-crystal display is constituted by a liquid-crystal panel, a backlight, and the like. The display 32 may be an organic electroluminescence (EL) display. When the power supply switch 21 is switched on, the LED 34 is switched on at once without waiting for the activation process performed by the control unit 40, which will be described in detail below. Therefore, the power supply switch 21 according to the first exemplary embodiment serves as a switch for switching on the LED 34. The control unit 40 that has been activated controls switching off of the LED 34. Other than this, in the power-saving mode, the control unit 40 controls the LED 34 so that the LED 34 is switched on.

Operations

Operations performed by the image forming apparatus 10 according to the first exemplary embodiment will be described below. As described above, it takes a time equal to or more than three seconds to perform the activation process by the control unit 40 according to the first exemplary embodiment. Therefore, it takes approximately three seconds or more to perform a process from an operation of switching on the power supply switch 21 to an operation of switching on the backlight of the display 32.

However, if a change in an image is the only way to recognize the switching-on state of the power supply, when it takes three seconds or more to switch on the backlight and raise the brightness of the backlight, a typical user may feel an anxiety about whether or not the power supply switch 21 has been switched on, and may press the power supply switch 21 twice. Accordingly, in the image forming apparatus 10 according to the first exemplary embodiment, an operation of switching on the power supply switch 21 triggers switching on of the LED 34 so that the switching-on state of the power supply may be checked before the brightness of the backlight is raised.

Figure 3:
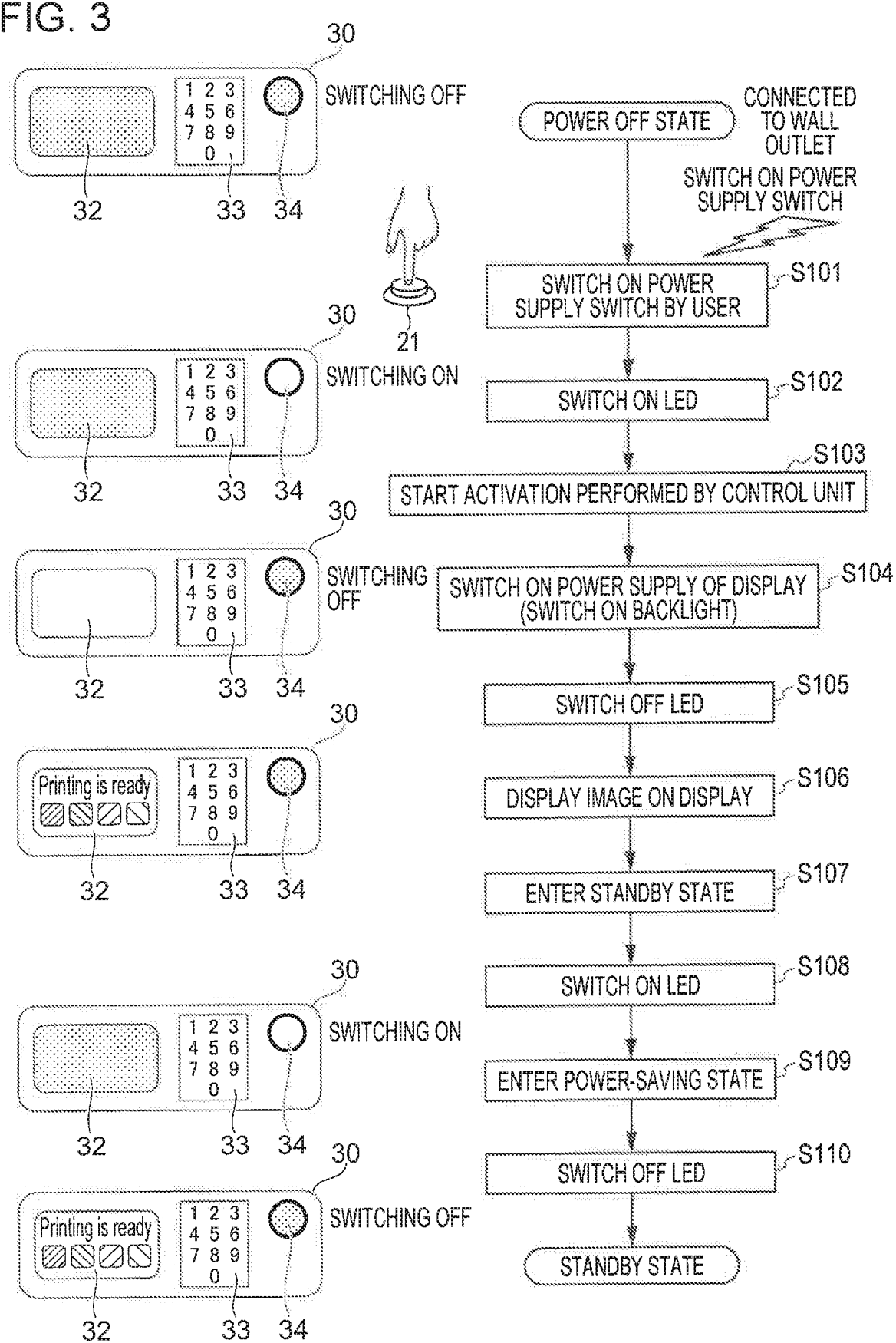

FIG. 3 is a diagram for describing timings at which the LED 34 is switched on and off after the power supply switch 21 is switched on. In the initial state, the power cable is connected to a wall outlet, but the power supply switch 21 has not been switched on. Since the power cable is connected to the wall outlet, power is supplied to the units of the image forming apparatus 10. However, since the control unit 40 has not been activated, the functions of the units that need software control are stopped. In this stage, the display 32 and the LED 34 are switched off. Only the fax receiving function is enabled.

Then, a user switches on the power supply switch 21 (step 101). This switching-on operation triggers a transition of the LED 34 from the switching-off state to the switching-on state (step 102). At this time point, the display 32 is still switched off. The operation of switching on the power supply switch 21 triggers the activation process which is started by the control unit 40 (step 103). As a matter of course, the LED 34 is still switched on.

Upon completion of the activation process performed by the control unit 40, the power supply of the display 32 is switched on (step 104). That is, the backlight of the liquid-crystal display is switched on. In FIG. 3, since the brightness of the screen is raised, the display on the display 32 turns white. At this time point, since control performed by the control unit 40 has been started, the control unit 40 controls the LED 34 so that the LED 34 is switched off (step 105). That is, the switching-on state of the LED 34 continues from step 102 to step 105. Therefore, the user checks that the power supply has been switched on through the operation of switching on the power supply switch 21, through switching on of the LED 34 without waiting for the brightness of the display 32 being raised. Therefore, a user does not feel an anxiety about the switching-on state of the power supply, achieving avoidance of an erroneous operation on the power supply switch 21.

After that, the control unit 40 causes the display 32 to display an image (step 106). In FIG. 3, a screen for a message of "Printing is ready" is displayed on the display 32. When an operation on the operation receiving unit 30 has not been performed in a predetermined time or more, the control unit 40 makes a transition to the standby state (step 107). Upon entering of the standby state, the control unit 40 controls the LED 34 so that the LED 34 is switched on (step 108), and the apparatus enters the power-saving state (step 109). Upon entering of the power-saving state, the display 32 is switched off. Even when the display 32 is switched off, if the LED 34 is switched on, the user may check the switching-on state of the power supply.

When a user operation is performed and the power-saving state ends, the control unit 40 causes the LED 34 to be switched off, and causes the display 32 to display an image (step 110). After that, the control unit 40 makes a transition to the standby state in which a user operation is waited for.

Other Exemplary Embodiments

In the above-described exemplary embodiment, the case in which the LED 34 that has been switched on in conjunction with an operation of switching on the power supply switch 21 is controlled so as to be switched off at a timing at which the backlight of the display 32 is switched on is described. However, the timing at which the LED 34 is switched off is not limited to this. Other examples of a switching-off timing will be described below.

Figure 4:
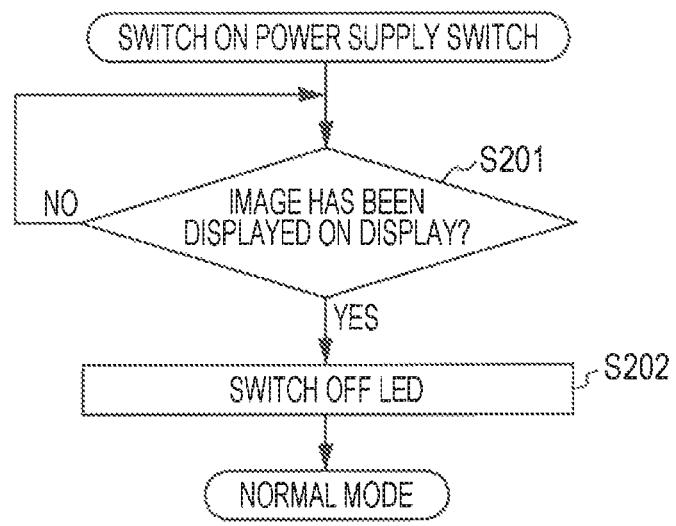
FIG. 4 is a flowchart for describing a procedure performed by a control unit when the LED is controlled so as to be switched off at a timing at which an image is displayed on a display.

FIG. 4 is a flowchart for describing a procedure performed by the control unit 40 when the LED 34 is controlled so as to be switched off at a timing at which an image is displayed on the display 32. The control unit 40 that has been activated through an operation of switching on the power supply switch 21 determines whether or not an image has been displayed on the display 32 (step 201). While a negative result is obtained, the control unit 40 repeatedly makes a determination in step 201. Therefore, in a period before an image is displayed on the display 32, the LED 34 continues to be switched on even after the backlight is switched on.

In contrast, if a positive result is obtained in step 201, the control unit 40 controls the LED 34 so that the LED 34 is switched off (step 202). In this case, a user may check the switching-on state of the power supply through switching on of both of the display 32 and the LED 34. The time in which the LED 34 is switched on is longer compared with the case in which the LED 34 is switched off when the backlight is switched on, resulting in an increase in power consumption. However, the increase is slight.

Figure 5:
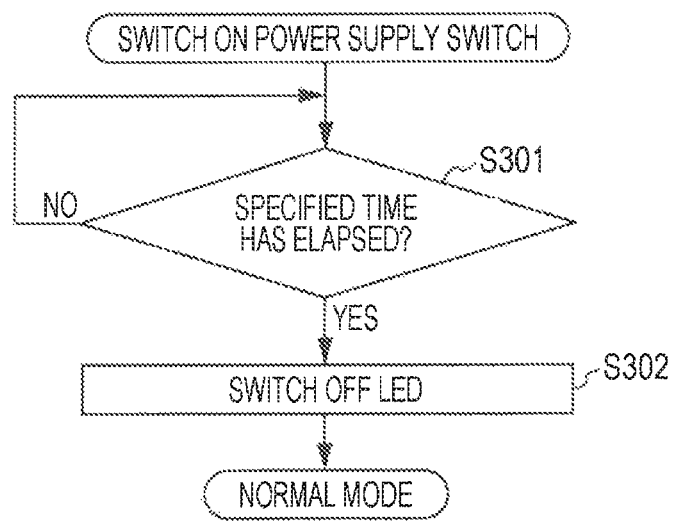
FIG. 5 is a flowchart for describing a procedure performed by the control unit when the LED is controlled so as to be switched off at a timing at which a time specified by a user has elapsed.

FIG. 5 is a flowchart for describing a procedure performed by the control unit 40 when the LED 34 is controlled so as to be switched off at a timing at which the time specified by a user has elapsed. The control unit 40 that has been activated through an operation of switching on the power supply switch 21 determines whether or not a predetermined time (specified time) has elapsed (step 301). The specified time may be given by a user or a designer. A time until the power supply of the backlight is switched on or a time until an image is displayed on the display 32 may be set as the specified time in the design stage. While a negative result is obtained, the control unit 40 repeatedly makes a determination in step 301.

In contrast, if a positive result is obtained in step 301, the control unit 40 controls the LED 34 so that the LED 34 is switched off (step 302). The switching-off timing of the LED 34 is specified on a time basis so that the switching-off timing may be given regardless of a timing at which a change occurs on the screen of the display 32. For example, the LED 34 may be switched off before a change occurs on the screen of the display 32, or the LED 34 may be switched off after an image is displayed on the display 32. In this case, an operation of switching on the power supply switch 21 triggers switching on of the LED 34. Therefore, a user checks that the power supply is in the switching-on state through the switching on of the LED 34. As a result, an erroneous operation is avoided.

In the above-described exemplary embodiment, the switching-off timing is set in advance. A user may set the switching-off timing as the user wants. FIG. 6 is a diagram illustrating an exemplary administrator setting screen 50 prepared to set the period during which the LED 34 is switched on (specifically, the switching-off timing) when the power supply switch 21 is switched on. The administrator setting screen 50 is displayed on the display 32 through input of a user operation on the operation receiving unit 30.

On the administrator setting screen 50, the following four options are displayed: (1) switching off the LED 34 at once that has been switched on; (2) continuing switching on of the LED 34 until an image is displayed on the display (switching off the LED 34 when the backlight of the display 32 is switched on); (3) continuing the switching on; and (4) continuing the switching on until the specified time has elapsed (switching off the LED 34 after the specified time has elapsed). When "Switching off at once" is selected, power consumed by the LED 34 is the least. Even when the LED 34 is switched off just after the LED 34 is switched on, a user is unlikely to overlook the switching on of the LED 34 because a user operation of switching on the power supply switch 21 triggers switching on of the LED 34. In FIG. 6, "Switching off at once" is selected.

On the administrator setting screen 50, an input field 51 for a specified time is provided. A specified time at which the LED 34 is to be switched off is input in the input field 51. On the administrator setting screen 50, a button 52 for checking the information that has been input and confirming the information that has been selected is provided. An option, which is not illustrated on the administrator setting screen 50 illustrated in FIG. 6, in which switching on of the backlight is set as the switching-off timing of the LED 34 may be displayed.

In the above-described exemplary embodiments, as illustrated in FIG. 3, the case in which the power supply switch 21 and the LED 34 are separately disposed is described. Any of the following configurations may be employed: a configuration in which the LED 34 and the power supply switch 21 may be formed as an integral unit (the power supply switch 21 itself may be the LED 34); a configuration in which the power supply switch 21 includes the LED 34 as a part; and a configuration in which the LED 34 surrounds the power supply switch 21. In the case where any of the configurations is employed, a user easily checks switching on of the LED 34 while operating the power supply switch 21.

In the above-described exemplary embodiments, the image forming apparatus 10 is described as an exemplary information processing apparatus. As long as the apparatus is an apparatus in which a change takes a long time to occur on the screen of the display 32 (for example, a change in brightness takes a long time to occur, or an image takes a long time to be displayed) after the power supply switch 21 is switched on, any information processing apparatus, such as a notebook computer, a tablet computer, a smartphone, a cellular phone, a camera, or a portable game console, may be used as an exemplary information processing apparatus.

As described above, the exemplary embodiments of the present invention are described. The technical scope of the present invention is not limited to the scope described in the above-described exemplary embodiments. It is clear, from the description of the scope of claims, that embodiments obtained by making various changes and improvements on the above-described exemplary embodiments are included in the technical scope of the present invention.

What is claimed is:

1. An information processing apparatus comprising:
   a power supply switch configured to perform a control function;
   a display configured to display an image after an operation of switching on the power supply switch, the display including a backlight;
   a light configured to be switched on when the operation of switching on the power supply is performed and before the image is displayed; and
   a controller configured to:
      switch off the light at least in response to the backlight of the display being switched on and before the image is displayed on the display; and
      refrain from switching off the light in response to the backlight of the display not being switched on.

2. The information processing apparatus according to claim 1, wherein the controller is further configured to switch off the light after a time period has elapsed and after the backlight of the display has been switched on.

3. The information processing apparatus according to claim 1, wherein the controller is configured to display, on the display, a screen for receiving a change of a switching-off condition.

4. The information processing apparatus according to claim 1, wherein, when the controller is configured to transition to a power-saving mode in which the display is switched off, the controller switches on the light.

5. The information processing apparatus according to claim 1, wherein the light is disposed at a position at which the light is checked while the power supply switch is operated.

6. The information processing apparatus according to claim 5, wherein one of first to fourth configurations is employed, the first configuration being such that the light is disposed so as to be adjacent to the power supply switch, the second configuration being such that the light is formed with the power supply switch as an integral unit, the third configuration being such that the light is formed as a part of the power supply switch, the fourth configuration being such that the light is disposed so as to surround the power supply switch.

7. The information processing apparatus according to claim 1, wherein the controller is further configured to switch off the light in response to determining that the image is displayed and after the backlight of the display has been switched on.

8. The information processing apparatus according to claim 1, wherein the controller is further configured to allow a user to access a menu screen displayed on the display, the menu screen being an interface where the user is allowed to change a switching-off timing of the light.

9. A non-transitory computer readable medium storing a program causing a computer to execute a process, the computer being included in an information processing apparatus in which a displayed image on a display is delayed from a switching on of a power supply switch such that a user is likely to fail to correctly recognize a switching-on state of the power supply switch, the power supply switch being used to operate a functional unit, the process comprising:
   displaying the image on the display after an operation of switching on the power supply switch, the display including a backlight;
   switching on a light when the operation of switching on the power supply is performed and before the image is displayed;
   switching off the light at least in response to the backlight of the display being switched on and before the image is displayed on the display; and
   refraining from switching off the light in response to the backlight of the display not being switched on.

10. The non-transitory computer readable medium according to claim 9, wherein the switching off of the light occurs after a time period has elapsed and after the backlight of the display has been switched on.

11. The non-transitory computer readable medium according to claim 9, the process further comprising:
   switching on the light when a transition to a power-saving mode is made, the power-saving mode being a mode in which the display is switched off.

12. An information processing apparatus comprising:
   a power supply switch configured to perform a control function;
   a display configured to display an image after an operation of switching on the power supply switch, the display including a backlight, the image indicating that the information processing apparatus is in a standby mode and ready to print;
   a light configured to be switched on when the operation of switching on the power supply is performed and before the image is displayed; and
   a controller configured to:
      switch off the light at least in response to the backlight of the display being switched on and before the image is displayed on the display; and
      refrain from switching off the light in response to the backlight of the display not being switched on.

* * * * *